(12) United States Patent
Habte

(10) Patent No.: US 11,685,235 B2
(45) Date of Patent: Jun. 27, 2023

(54) AIR VENT ASSEMBLY WITH FIXED VANES AND NARROW PROFILE

(71) Applicant: JoysonQuin Automotive Systems North America, LLC, Troy, MI (US)

(72) Inventor: Melaku Habte, Rochester Hills, MI (US)

(73) Assignee: JOYSONQUIN AUTOMOTIVE SYSTEMS NORTH AMERICA, LLC, Troy, MI (US)

( * ) Notice: Subject to any disclaimer, the term of this patent is extended or adjusted under 35 U.S.C. 154(b) by 225 days.

(21) Appl. No.: 17/162,506

(22) Filed: Jan. 29, 2021

(65) Prior Publication Data

US 2021/0237539 A1 Aug. 5, 2021

Related U.S. Application Data

(60) Provisional application No. 62/968,242, filed on Jan. 31, 2020.

(51) Int. Cl.
*B60H 1/34* (2006.01)
*B60H 1/00* (2006.01)
*F24F 3/10* (2006.01)
*F24F 13/12* (2006.01)

(52) U.S. Cl.
CPC ....... *B60H 1/3421* (2013.01); *B60H 1/00485* (2013.01); *B60H 2001/3471* (2013.01)

(58) Field of Classification Search
CPC ............... B60H 1/3421; B60H 1/3414; B60H 1/00485; B60H 2001/3471; F24F 13/10; F24F 13/12
See application file for complete search history.

(56) References Cited

U.S. PATENT DOCUMENTS

| 11,007,844 B1 * | 5/2021 | Habte ................ B60H 1/00564 |
| 2007/0293134 A1 | 12/2007 | Shimada et al. |
| 2015/0328958 A1 | 11/2015 | Winget, Jr. et al. |
| 2018/0056756 A1 | 3/2018 | Schaal |
| 2018/0334015 A1 | 11/2018 | Doll et al. |
| 2019/0168583 A1 | 6/2019 | Dinant et al. |
| 2019/0359034 A1 | 11/2019 | Dinant et al. |

FOREIGN PATENT DOCUMENTS

| DE | 102017111011 A1 * | 7/2017 | ........... B60H 1/3414 |
| DE | 102017113906 A1 * | 8/2017 | ........... B60H 1/3414 |
| DE | 102017113906 A1 | 8/2017 | |
| DE | 102017218621 A1 | 4/2019 | |
| EP | 3321114 A1 * | 5/2018 | ........... B60H 1/3414 |

* cited by examiner

*Primary Examiner* — Steven S Anderson, II
(74) *Attorney, Agent, or Firm* — Fox Rothschild LLP

(57) ABSTRACT

An air vent assembly includes an air inlet, an air outlet, and a plurality of channels positioned between the air inlet and the air outlet. A first set of fixed vanes is positioned in a first one of the channels. The fixed vanes of the first set are angled or curved in a first direction with respect to a flow vector of the air inlet. A second set of fixed vanes is positioned in a second one of the channels. The fixed vanes of the second set are angled or curved in a second direction with respect to a flow vector of the air inlet. A gate is positioned within grooves of each of the first and second sets of fixed vanes. The gate is configured to regulate a position at which air may enter the first and second channels from the air inlet.

21 Claims, 14 Drawing Sheets

AIR VENT ASSEMBLY WITH FIXED VANES AND NARROW PROFILE

CROSS REFERENCE TO RELATED APPLICATION

This patent document claims priority to U.S. Provisional Patent Application No. 62/968,242, titled "Air Vent Assembly with Fixed Vanes and Narrow Profile", filed Jan. 31, 2020, which is incorporated herein by reference in its entirety.

BACKGROUND

Vehicle instrument panels (such as dashboards) are including larger and more electronic screens (such as multi-information displays) with sensor readouts and equipment control inputs. For example, in a truck, van or automobile, example sensor readouts may include a speedometer, tachometer, odometer, engine temperature, oil level, warning lights and the like. Example equipment controls may be for vehicle climate, radio, windshield wipers, engine gear selection, interior and exterior lights, and the like. Other types of vehicles, such as boats, airplanes and the like, also are increasingly using larger and more electronic screens in the instrument panel.

To assist with climate control inside of a vehicle, air vents may be positioned at various locations on the instrument panel to accommodate the vehicle driver and other passengers in the vehicle. The surface area of each air vent is in direct competition with the desire for larger electronic screens on the instrument panel while maintaining a streamlined appearance. Thus, there is a desire to provide an air vent with a slim design. There is also a desire to provide air vents in a vehicle instrument panel with no manual controls.

This document describes a novel solution that addresses at least some of the issues described above.

SUMMARY

In various embodiments, an air vent assembly includes an air inlet, an air outlet, and a plurality of channels positioned between the air inlet and the air outlet. A first set of fixed vanes is positioned in a first one of the channels. The fixed vanes of the first set are angled or curved in a first direction with respect to a flow vector of the air inlet. A second set of fixed vanes is positioned in a second one of the channels. The fixed vanes of the second set are angled or curved in a second direction with respect to a flow vector of the air inlet. A gate is positioned within grooves of each of the first and second sets of fixed vanes. The gate is configured to regulate a position at which air may enter the first and second channels from the air inlet.

Optionally, the air vent assembly may include an actuator that is configured to move the gate.

Optionally, the gate may include a first gate segment that is positioned in grooves of the first set of fixed vanes and a second gate segment that is positioned in grooves of the second set of fixed vanes.

Optionally, the gate may be configured to be moved so that: (a) moving the gate in a first direction will narrow size of a first duct leading to the first and second channels; and (b) moving the gate in a second direction will narrow size of a second duct leading to the first and second channels.

Optionally, the air vent assembly of claim 1 may include a divider that is proximate the vanes and which separates the first duct and the second duct.

Optionally, the air vent assembly also may include a flow volume regulating valve that is positioned between the air inlet and the channels. The flow volume regulating valve may be configured to regulate volume of air that may flow from the air intake to the channels when moved. The flow volume regulating valve may include one or more curved panels positioned within matching curved grooves. Alternatively, the flow volume regulating valve may include a pivotable divider that serves as a shut off door, with a pair of walls serving as flaps, each of which is configured to pivot about a pivot point.

Optionally, the air vent assembly also may include a directional valve that is positioned between the air inlet and the fixed vanes. The directional valve may be configured to reduce or increase intake size of one or more of the channels when moved. The directional valve may include a curved panel positioned within matching curved grooves, or other structures as described below.

DETAILED DESCRIPTION

Terminology that is relevant to this disclosure is provided at the end of this detailed description. The illustrations are not to scale. The air vent assembly may be oriented horizontally or vertically when installed in a vehicle or other structure. A horizontal air vent could be positioned above or below one or more electronic screens, forming a streamlined appearance, such as in an extended center console of the instrument panel or along the top and bottom edges of the instrument panel. Horizontal air vents may also be positioned proximate the windshield for defrosting the windshield. A vertically oriented vent may be positioned beside an electronic screen or between two electronic screens forming a streamlined appearance, such as between a sensor readouts electronic screen for the driver, a center console electronic screen, and a passenger's electronic screen. Vertical air vents may also be positioned near the vehicle's doors for defrosting side windows.

Figure 1:
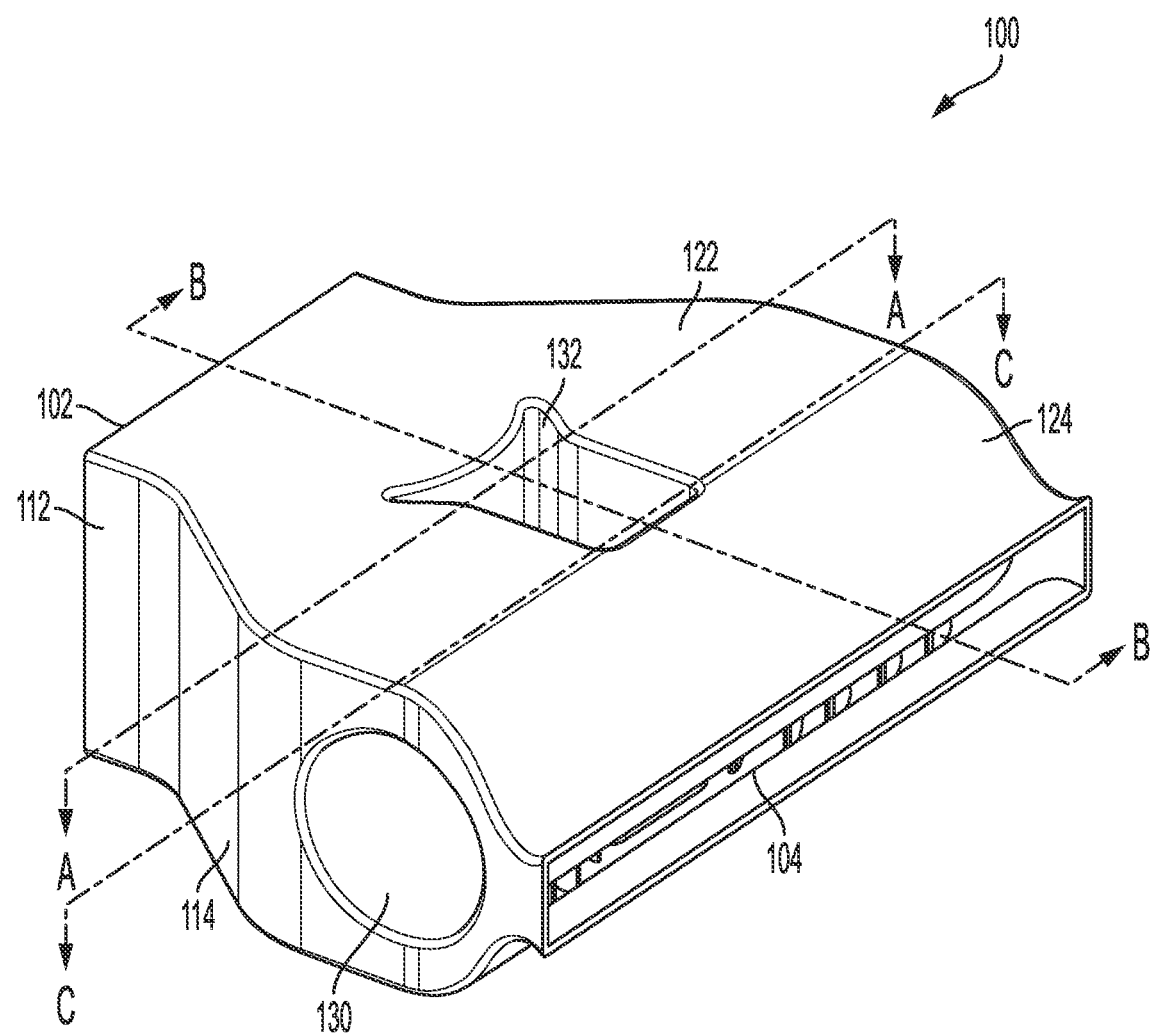
FIG. 1 is an isometric view of an example air vent assembly.
Figure 2:
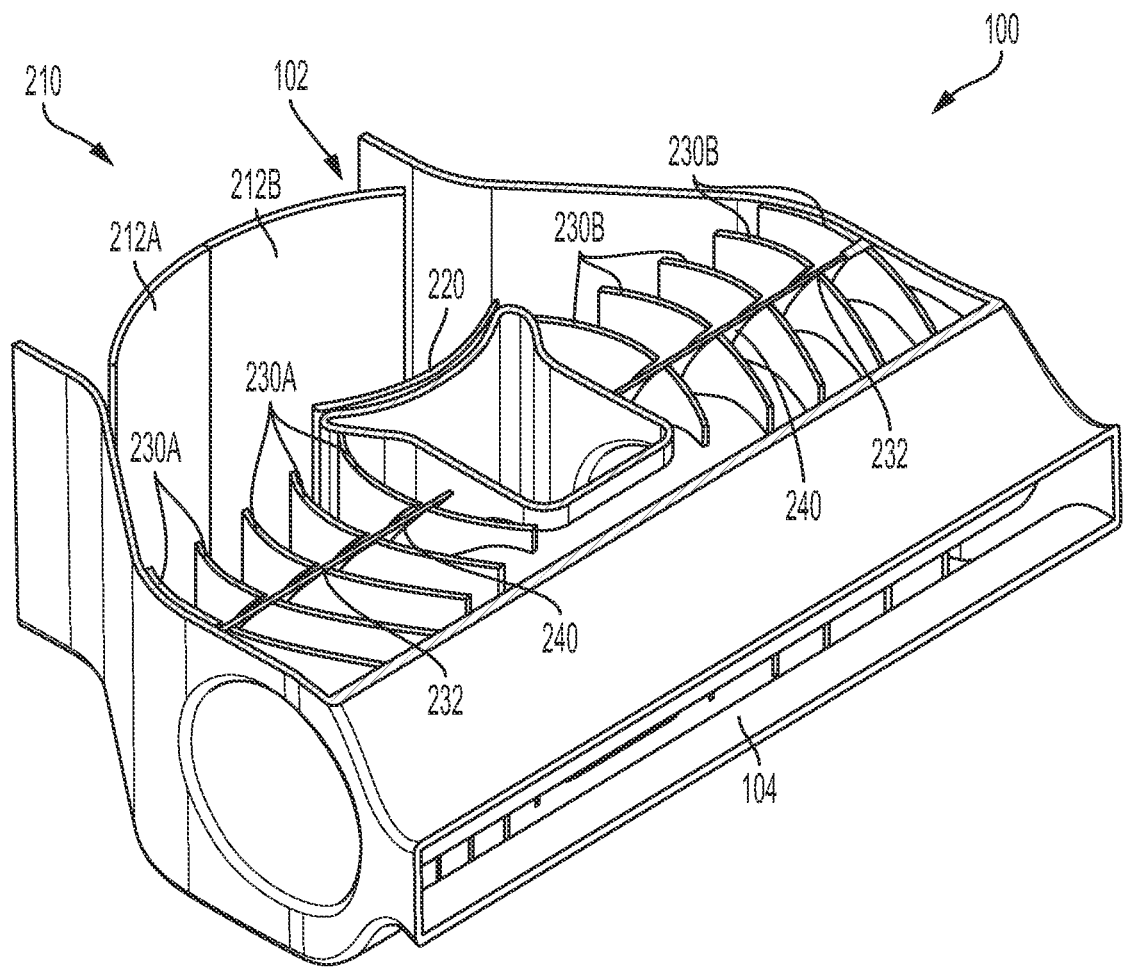
FIG. 2 is a partial view of the air vent assembly of FIG. 1 with one surface removed along cutline A-A.
Figure 3:
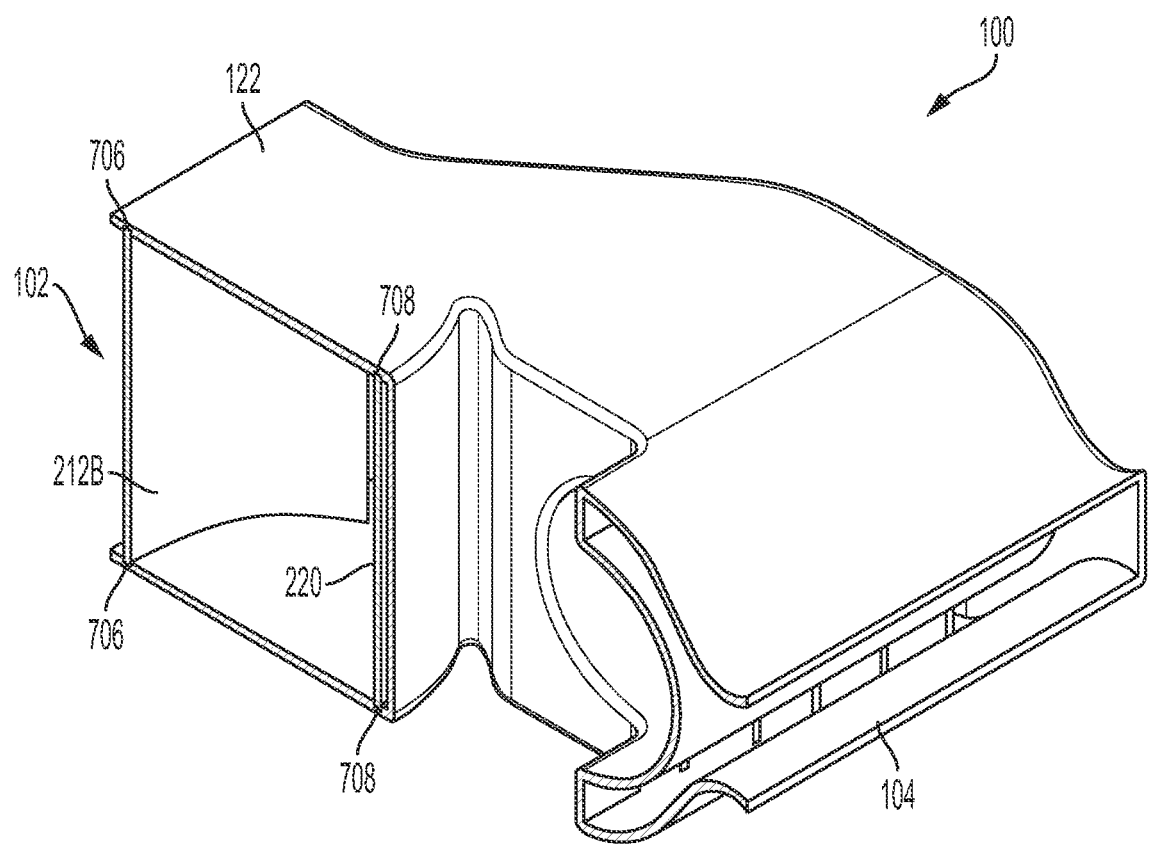
FIG. 3 is a partial view of the air vent assembly of FIG. 1 along cutline B-B.
Figure 4:
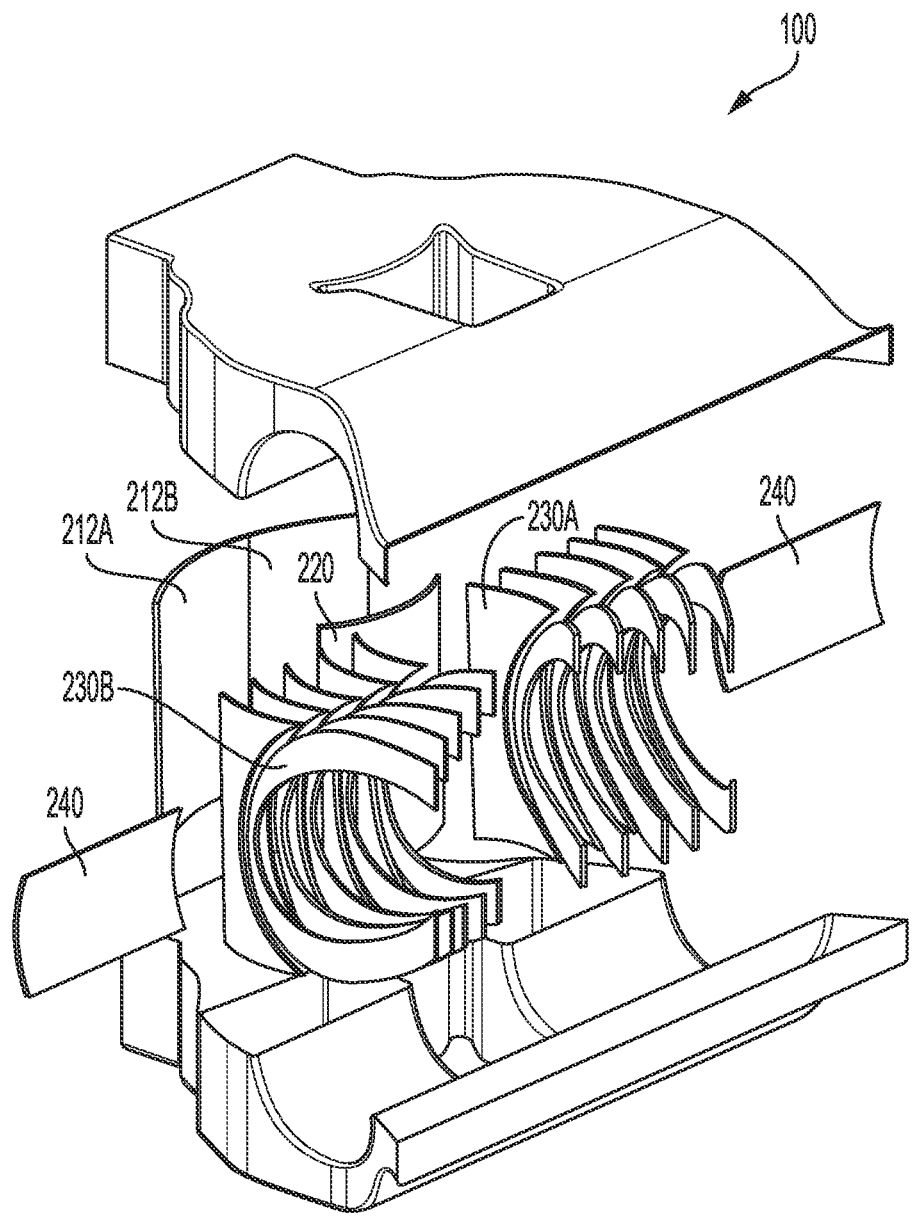
FIG. 4 is an expanded view of the air vent assembly of FIG. 1.
Figure 5:
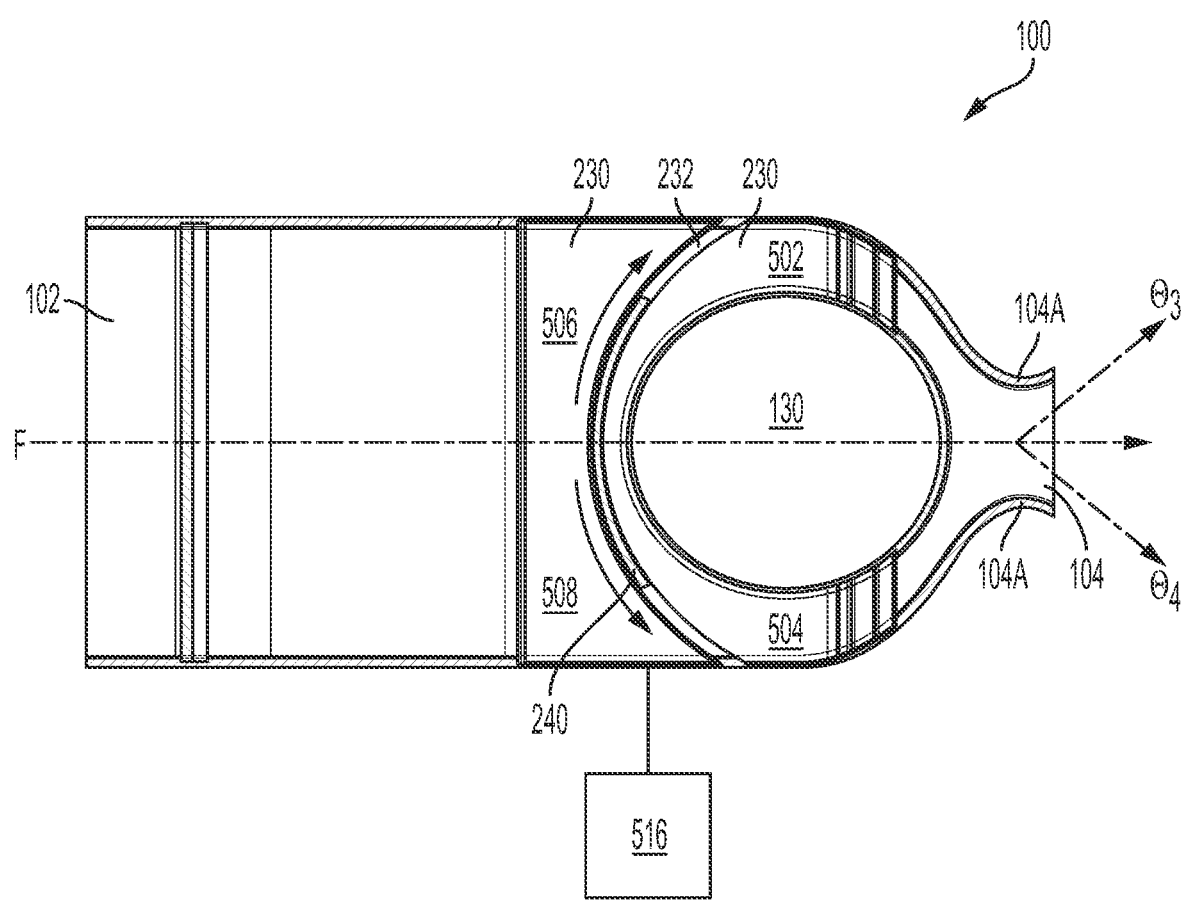
FIG. 5 is a sectional view of the air vent assembly of FIG. 1 along cutline B-B.
Figure 7:
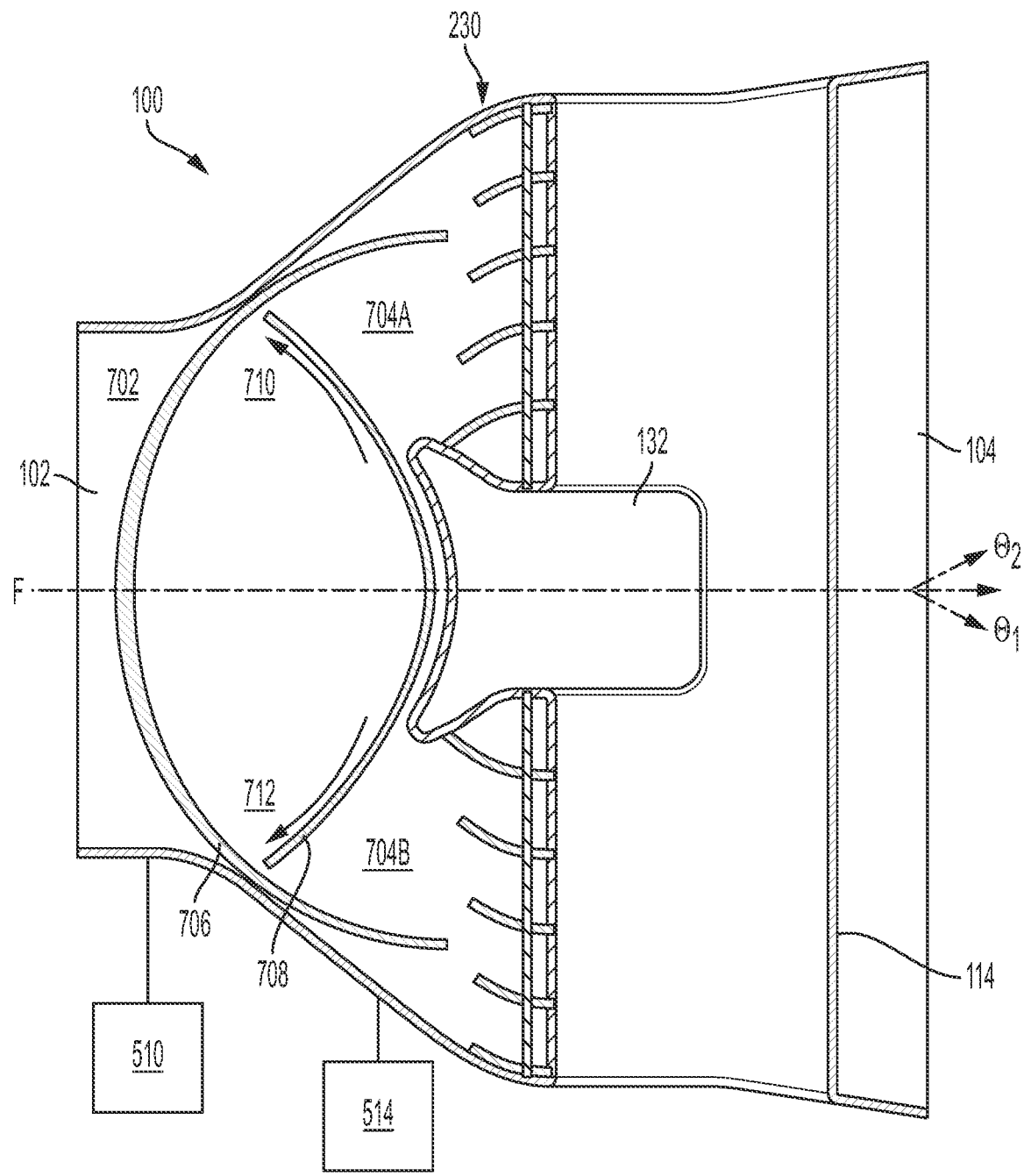
FIG. 7 is a partial sectional view of the air vent assembly of FIG. 1 along cutline C-C with a flow volume regulating valve and a directional valve removed.

FIG. 1 is an isometric view of an example air vent assembly 100, FIG. 2 is a partial view of the air vent assembly 100 of FIG. 1 with one surface removed along cutline A-A, FIG. 3 is a partial view of the air vent assembly 100 of FIG. 1 along cutline B-B, FIG. 4 is an expanded view of the air vent assembly 100 of FIG. 1, FIG. 5 is a sectional view of the air vent assembly 100 of FIG. 1 along cutline B-B, while FIG. 7 is a partial sectional view of the air vent assembly 100 of FIG. 1 along cutline C-C with a flow volume regulating valve 210 and a directional valve 220 removed. FIGS. 9A-12 illustrate an alternate embodiment of the air vent assembly 100.

The air vent assembly 100 may include a housing that includes an air inlet 102, an air outlet 104, and a conduit 702 leading to two or more channels 704A, 704B positioned between the air inlet 102 and the air outlet 104. Heated, cooled or vented air (such as conditioned air for climate control) is forced through the air vent assembly 100 by a fan, such as may exist in a heater or air conditioning unit (not shown). Air flow enters the air inlet 102 of the air vent assembly 100, is divided into each open channel 704A, 704B, and recombines at the air outlet 104 to direct the conditioned air into the passenger compartment of the vehicle. While the figures show a configuration in which the air inlet 102 is narrower than the air outlet 104, the invention is not limited to such a configuration. In other embodiments, air inlet 102 may be wider than air outlet 104, or air inlet 102 may be the same size as air outlet 104.

The air vent assembly 100 may have outer walls to form the housing that holds the conduit 702 and channels 704A, 704B. For example, referring to FIG. 1, a first section of the air vent assembly 100 may have planar walls 112, 122 and a second section may have curved or angled walls 114, 124. For example, as shown in FIGS. 1 and 7, a first planar wall 112 may combine with a first curved wall 114 to form a first curvilinear outer wall. FIG. 1 shows that a second planar wall 122 may combine with a second curved wall 124 to form a second curvilinear outer wall. A first interior divider 130 and a second interior divider 132 may be positioned in the housing of the air vent assembly 100 to form vent sections. The curved walls may have other shapes, such as being angled or ribbed, so that they may form vent sections that includes the channels 704A, 704B and lead to an air outlet 104 that is wider than the air inlet 102. The first curvilinear outer wall and second curvilinear outer wall may form the outer surface of the housing. This planar/curved combination forming a curvilinear structure as illustrated in the Figures is optional, and other designs for the housing may be used depending on the size and shape of the space into which the air vent assembly 100 must fit. Optionally, the first interior divider 130 and/or the second interior divider 132 also may include outer sidewalls that form part of the outer surface of the housing; alternatively the dividers may be contained within the sidewalls of the housing. In an alternative embodiment, for example in FIGS. 9A-B, the second interior divider includes two subsections 132A and 132B that are separated by a guide rail 134 that is additionally positioned in the housing of the air vent assembly 100 and that receives and positions the directional valve 220 within the area of the second interior divider.

Optionally, a flow volume regulating valve 210 may be positioned in the conduit 702 to regulate the volume of air flow from the air intake 102 to the channels 704A, 704B. The flow volume regulating valve 210 may include, for example one or more movable interior divider walls 212A, 212B that are partially positioned within one or more interior grooves 706 as shown in FIGS. 2, 3 and 7. Optionally, the interior grooves 706 may be curved, linear, or the like to correspond to a shape of the divider walls 212A, 212B. The flow volume regulating valve 210 may be configured to regulate the volume of air flow and/or completely close off the flow of air to a downstream area of the conduit 702 and all channels 704A, 704B and serve as a shut-off door. For example, when the flow volume regulating valve 210 is moved to an open position, a maximum amount of air flow is directed through the conduit 702. to the two channels 704A and 704B. When the flow volume regulating valve 210 is moved to a closed position, the air flow through the conduit 702 to channels 704A and 704B will be blocked. At intermediate positions between the fully-opened and the fully-closed position, the flow volume regulating valve 210 may block part of the flow surface area within the conduit 702, thus regulating the volume of air that may flow through the conduit 702 to the channels 704A and 704B at any particular air flow speed. The movement of the flow volume regulating valve 210 may be interconnected to a first actuator 510 such as a motor and corresponding structure such as cams or axles configured to move the flow volume regulating valve 210 from the fully-opened position to the fully-closed position or any position in between in response to a signal, as will be described in more detail below. Instead of a shutter curved divider wall sliding within a groove, the flow volume regulating valve 210 may be in the form of other configurations, such as a diaphragm shutter, leaf shutter or other shutter, or a hinged door.

Figure 13A:
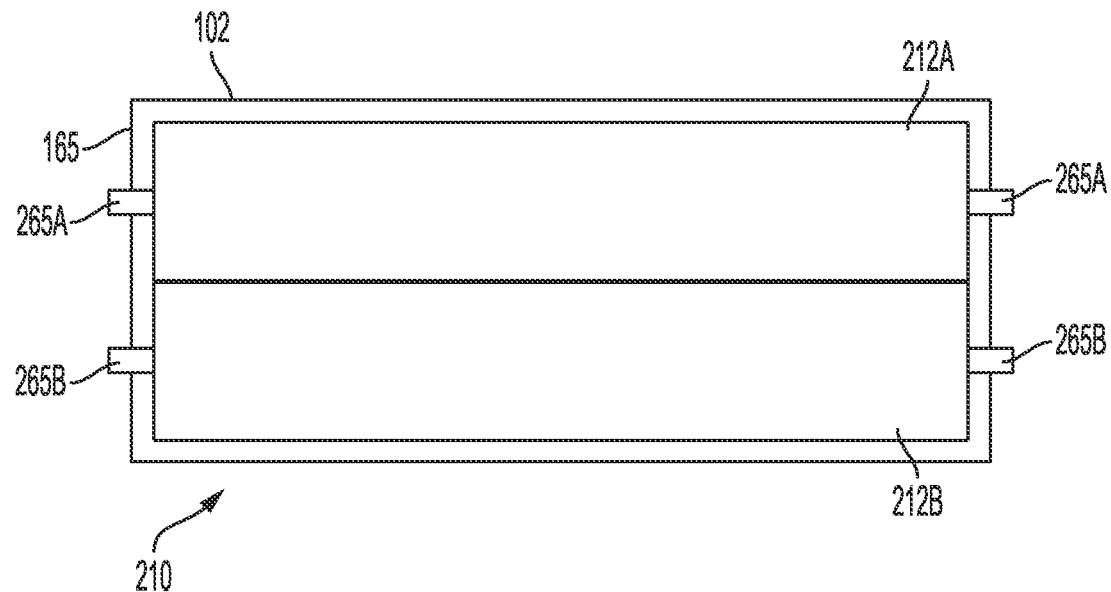
FIGS. 13A-13C illustrate an alternate embodiment of a flow volume regulating valve for an air vent assembly.
Figure 13B:
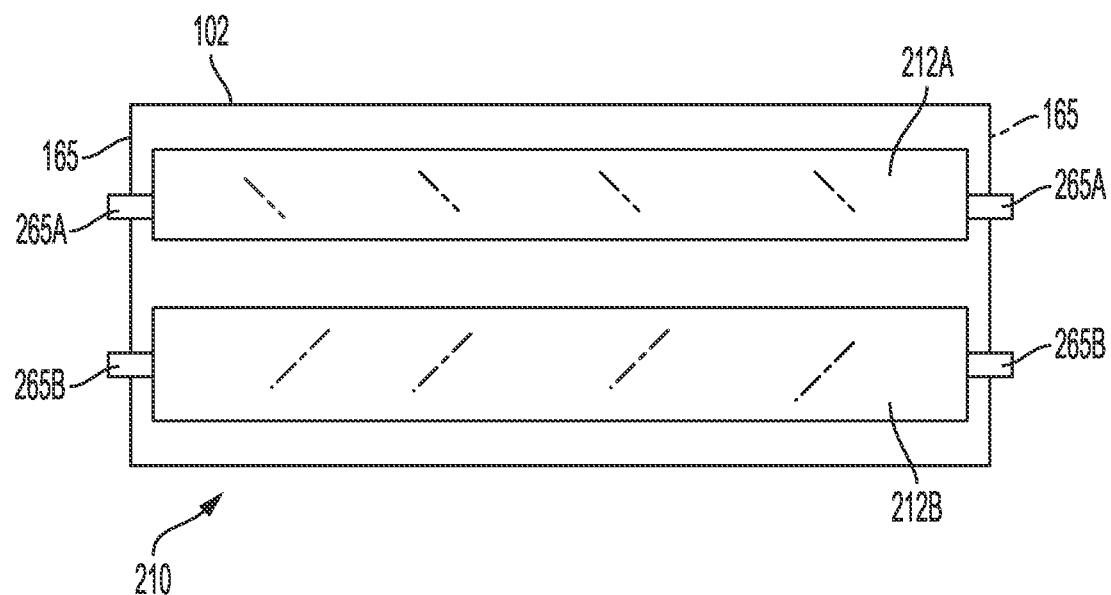
Figure 13C:
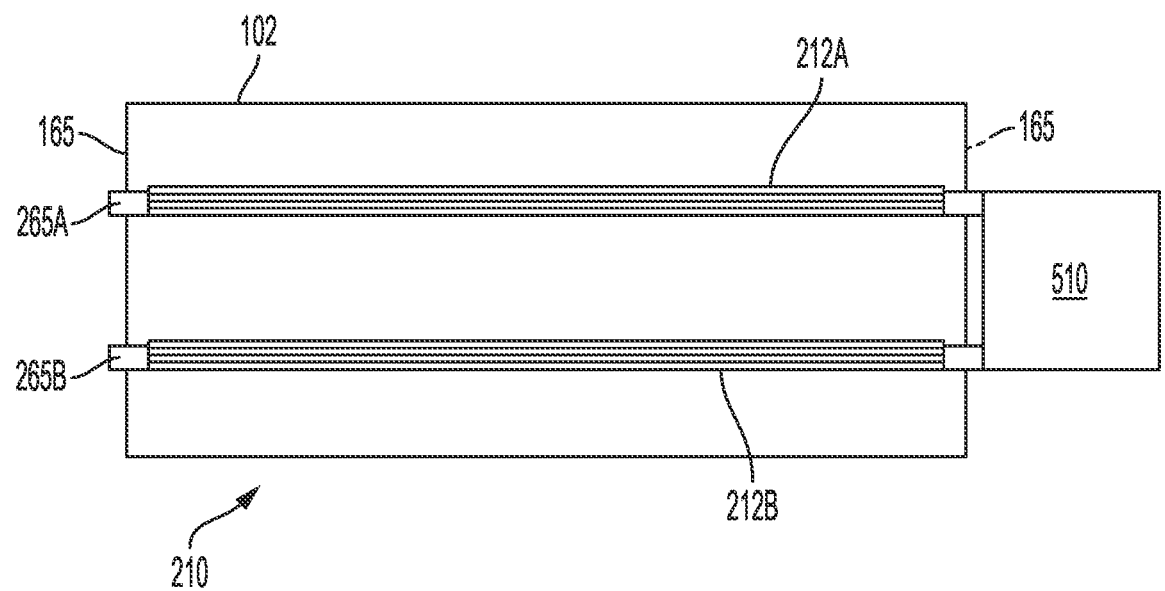

Optionally, and illustrated by way of example in FIGS. 13A-C, one or more interior walls 165 within the conduit 102 may have one or more pivot points 265A and 265B (such as a hinge or axle) to enable the flow volume regulating valve 210 to open and close, with interior divider walls 212A and 212B each positioned as flaps that may be pivoted to allow more or less air to flow through depending on the angle to which they are pivoted. When the walls 212A and 212B are in a fully-closed position as in FIG. 13A, the flow volume regulating valve 210 will completely close off the flow of air to a downstream area of the conduit and all channels (such as channels 704A, 704B of FIG. 7) and serve as a shut-off door. For example, when the walls 212A and 212B of the flow volume regulating valve 210 are at a midway point as in FIG. 13B, the air flow to the two channels is reduced by approximately half. When the flow volume regulating valve 210 is rotated to a fully-open position as in FIG. 13C, the air flow to the channels will beat its maximum volume. At other intermediate positions between the midway point and the fully-closed position, the flow volume regulating valve 210 may block part of the flow surface area within the conduit 202, thus reducing the volume of air that may flow to the channels at any particular air flow rate. FIG. 13C illustrates that one or more of the central pivot points 265A and 265B may be interconnected to an actuator 510 such as a motor that is configured to move the walls 212A and 212B from the fully-open point to the closing position or any position in between in response to a signal from the user, as will be described in more detail below. Instead of flaps and a pivot point, the flow volume regulating valve 210 may be in the form of other configurations, such as a shutter or sliding door.

Figure 8A:
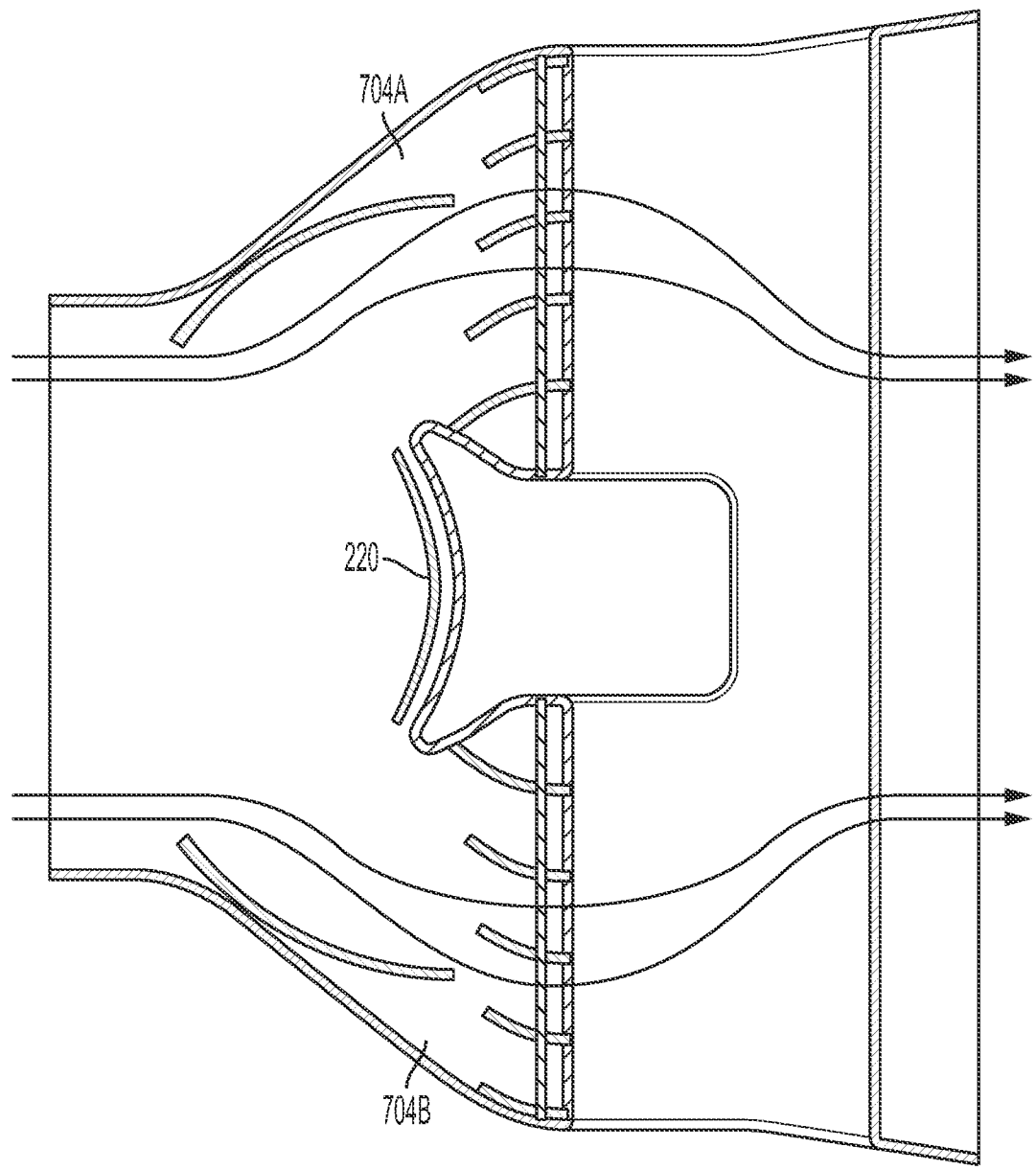
FIGS. 8A-8C are sectional views of the air vent assembly of FIG. 1 along cutline C-C in which the flow volume regulating valve and a directional valve are positioned in different locations.
Figure 9A:
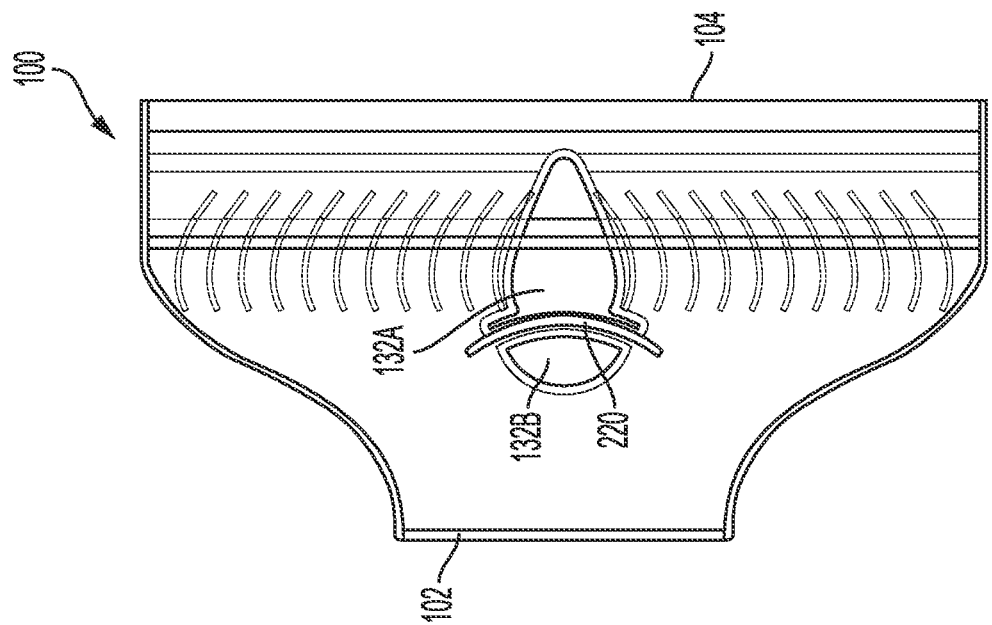
FIG. 9A is a top view of an alternate embodiment of air vent assembly.
Figure 9B:
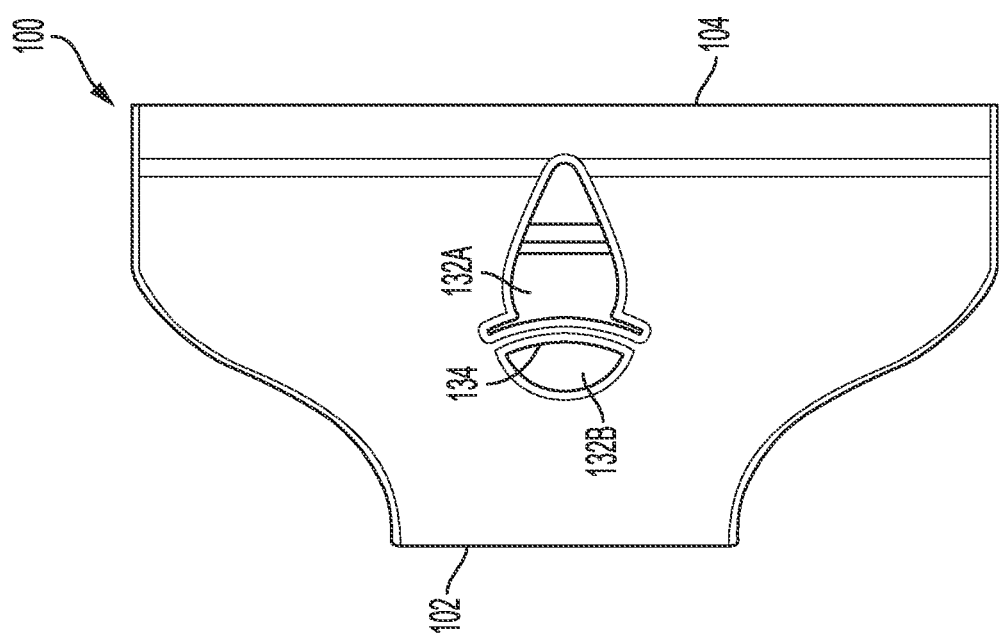
FIG. 9B is a cross sectional view corresponding to that of FIG. 9A.
Figure 10:
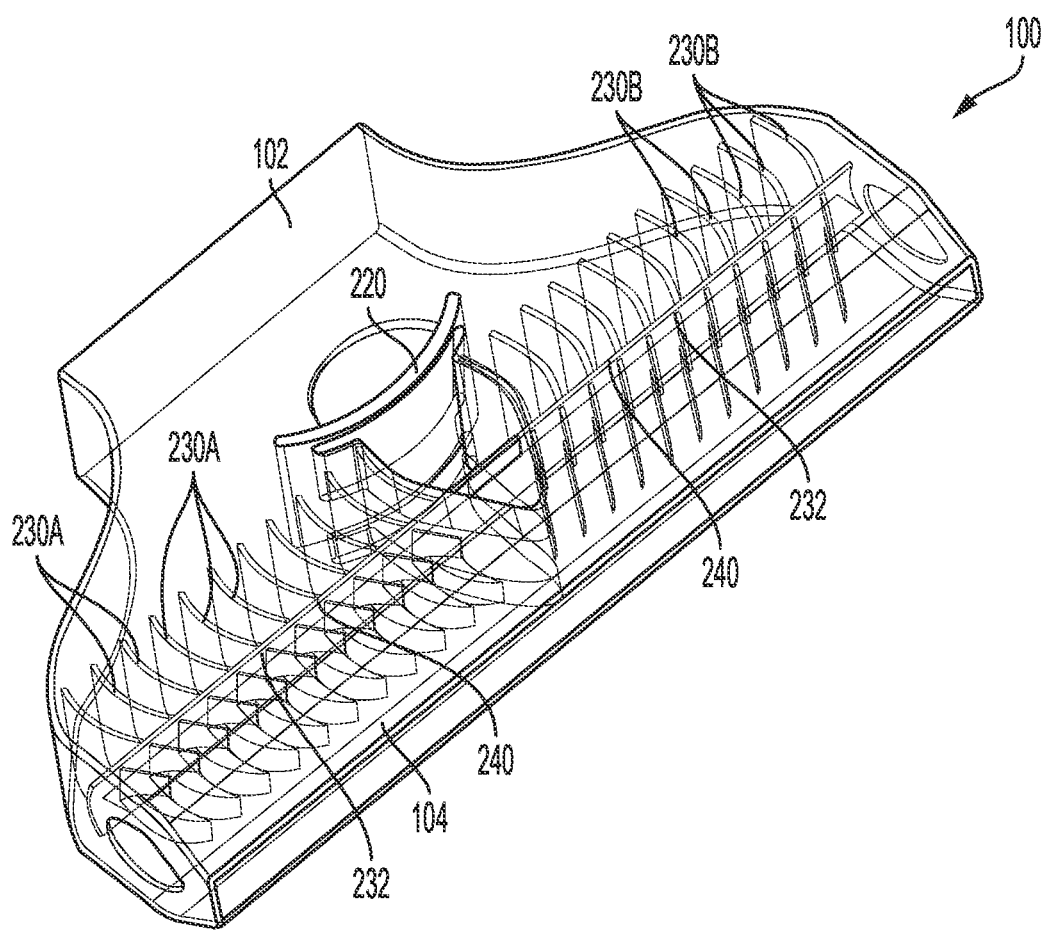
FIG. 10 is a cross-sectional view of an alternative embodiment of air vent assembly.
Figure 11:
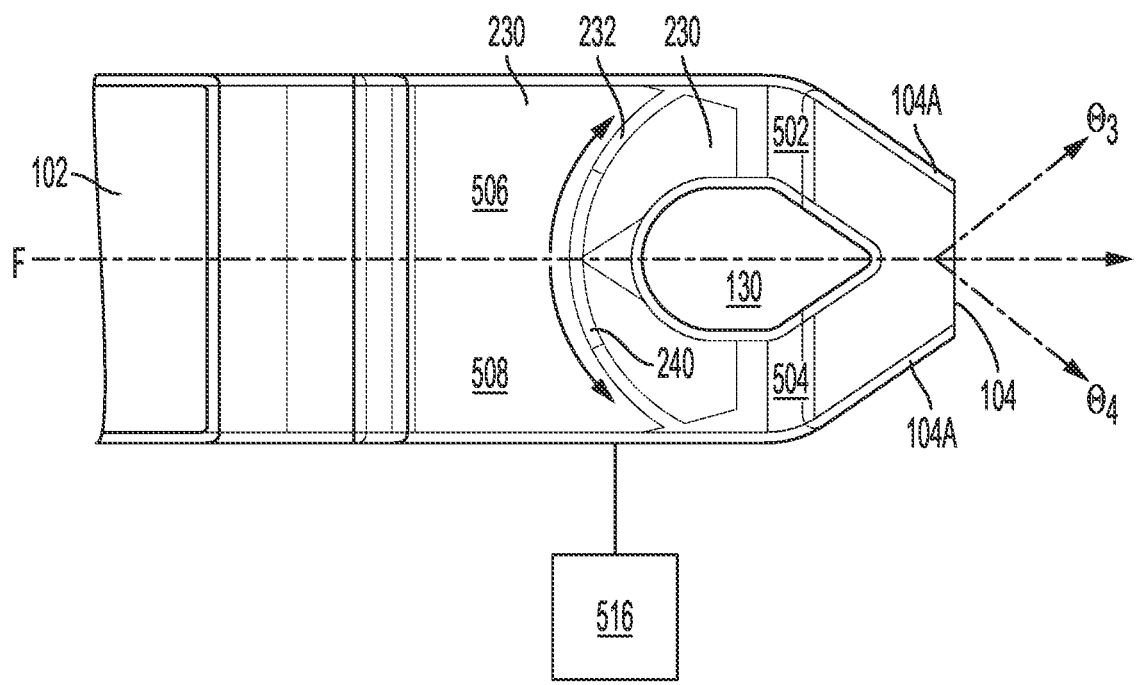
FIG. 11 is a cross-sectional side view of an alternative embodiment of the air vent assembly.
Figure 12:
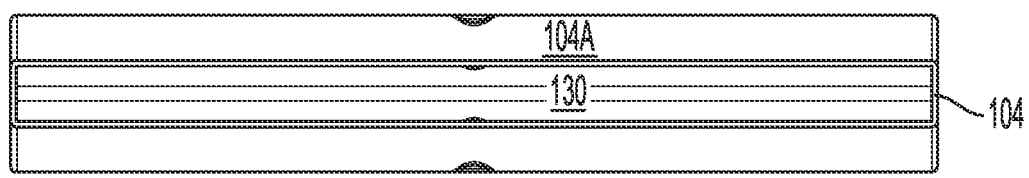
FIG. 12 is a front view of the air vent assembly.

A directional valve 220 may be positioned to regulate the size of (and thus the flow volume to) the inlets of the channels 704A, 704B. For example, the directional valve 220 may include one or more movable interior divider walls positioned within interior grooves 708 as shown in FIGS. 2, 3 and 7. Optionally, the interior grooves 708 may be curved, linear, or the like to correspond to a shape of the valve's wall. The directional valve 220 may be positioned at or near the intakes of each of the channels 704A, 704B. The directional valve 220 may be positioned and configured to move toward one channel or the other, and thus increase or decrease the intake size of one or more of the channels 704A, 704B when moved, thus serving to influence the direction of the air flow so that more of the available air flows in a direction toward one channel or the other. For example, when the directional valve 220 is at a midway point, the air flow is divided substantially equal to both channels 704A and 704B as shown in FIGS. 2, 7 and 8A. In an alternative embodiment, the directional valve 220 may be located between the segments of a divider 132A and 132B, with a guide rail 134 for example, as shown in FIGS. 9A-9B.

Figure 8B:
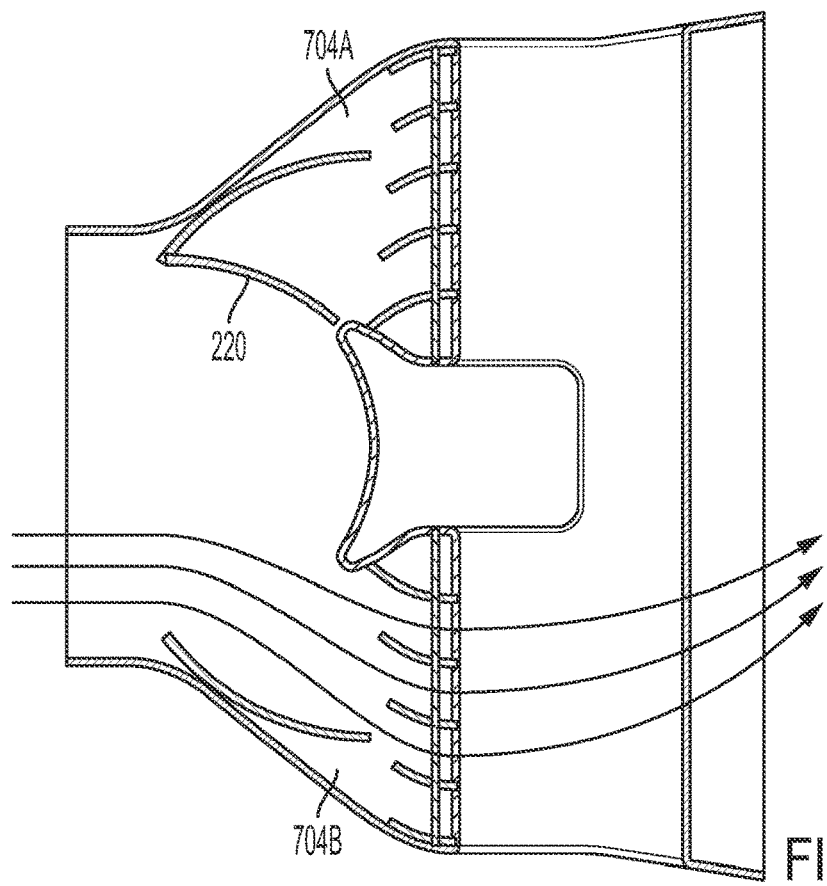

As shown in FIGS. 7 and 8B, when the directional valve 220 is rotated in a first direction 710 past the midway point toward the first channel 704A, the size of an intake leading to the first channel 704A while the size of the intake leading to the second channel 704B remains fully open. (The mode of operation described below for FIGS. 7 and 8A-8C also can be used with the configuration of FIGS. 9A-12.) When the flow volume regulating valve 210 is substantially open and the directional valve 220 is substantially blocking the first channel 704A, substantially all air flow is directed to the second channel 704B and exits the air outlet 104 in a first cross-car direction, as shown in FIG. 8B. (The use of "cross-car" direction in this example description presumes that the air vent assembly is installed so that its widest dimension extends horizontally across the vehicle; however, when installed vertically the directions would be up or down instead of cross-car.)

Figure 8C:
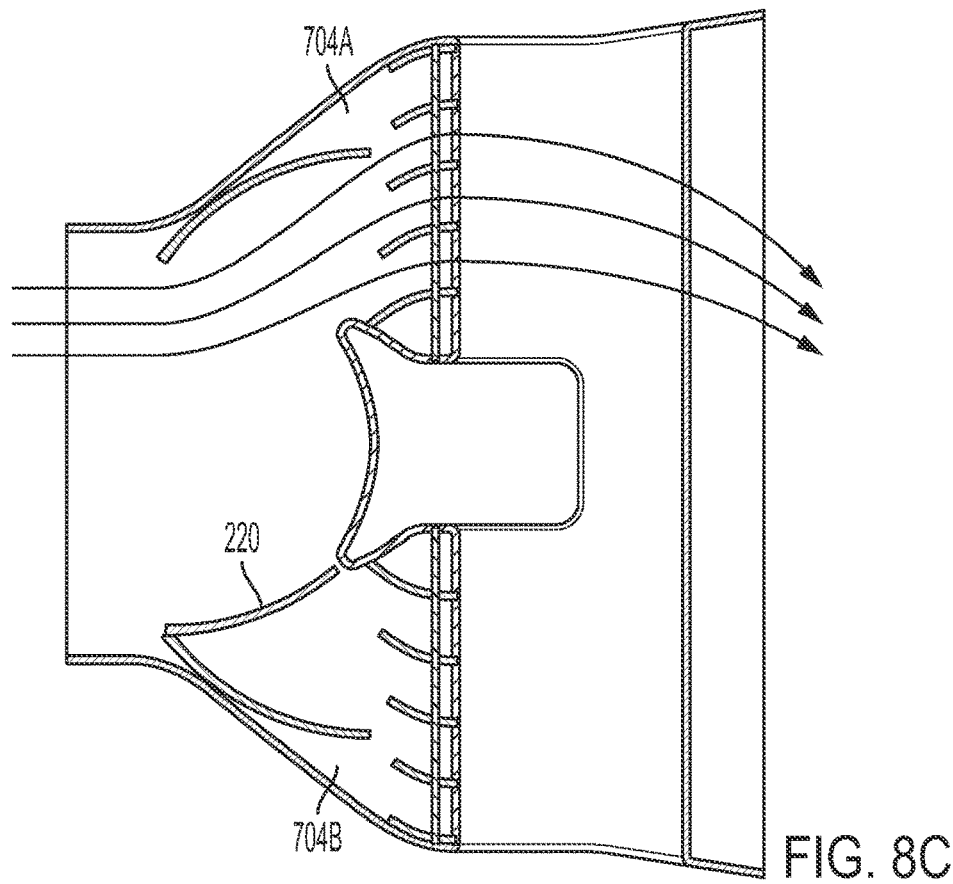

Likewise, referring to FIGS. 7 and 8C, moving the directional valve 220 in a second direction 712 past the midway point toward the second channel 704B allows the intake leading to the first channel 704A to remain fully open and decreases the size of the intake leading to the second channel 704B. As shown in FIG. 8C, when the flow volume regulating valve 210 is substantially open and the directional valve 220 is substantially blocking the second channel 704B, substantially all air flow is directed to the first channel 704A and exits the air outlet 104 in a second cross-car direction.

The first and second directions 710, 712 are opposite directions. The directional valve 220 may be interconnected to a second actuator 514 that is configured to move the directional valve 220 from the midpoint in the first or second direction 710, 712 in response to a signal, as will be described in more detail below. Instead of a sliding door, the directional valve 220 may be configured as a pivotal door or another structure that enables the system to selectively control the opening size of each channel 704A, 704B.

The shape of each channel 704A, 704B may be formed by the first and second interior dividers 130, 132 and the first and second curved walls 114, 124. Optionally, the surface area within each channel 704A, 704B may remain substantially constant from the channel's intake to the exit of the vent due to the increasing length between the first curved wall 114 and the second interior divider 132 and the decreasing width between the second curved walls 124, 124 and the first interior divider 130. The channels 704A, 704B are oppositely angled with respect to the air outlet 104 so that one channel directs air to the right (or upward) while the other channel directs air to the left (or downward). When the directional valve 220 decreases the inlet to one of the channels 704A, less air flow is directed to the channel 704A and more air flow is directed to the other channel 704B (or other channels, if additional channels are available).

Referring to FIG. 7, the first channel 704A may be positioned to direct air toward the air outlet 104 at a first angle $\theta_1$ with respect to an initial entry flow vector F of the air inlet 102, while the second channel 704B may be positioned to direct air toward the air outlet 104 at a second angle $\theta_2$ with respect to the flow vector F of the air inlet 102. The first angle $\theta_1$ and the second angle $\theta_2$ may be adjacent and substantially equal angles. The first angle $\theta_1$ and the second angle $\theta_2$ may be approximately 45° to 75°. For example, the first angle $\theta_1$ and the second angle $\theta_2$ may each be approximately 60°, providing a wide zone of conditioned air possibilities.

For example, when the directional valve 220 is at the midway point, the air flow is divided substantially equal to both channels 704A and 704B, combining in the air outlet 104 to direct air in a flow vector substantially equal to the initial entry flow vector F. When the directional valve 220 is rotated in the second direction 712 past the midway point into the second channel 704B, relatively more air flow is directed into the first channel 704A than into the second channel 704B, and thus relatively more exits the air outlet 104 in the direction of the first angle $\theta_1$ which may be in a first cross-car direction if the vent is horizontally oriented (that is, if its longest dimension is horizontal). Likewise, rotating the directional valve 220 in the first direction 710 past the midway point into the first channel 704A directs relatively more air flow into the second channel 704B than into the second channel 704a, and thus relatively more exits the air outlet 104 in the direction of the second angle $\theta_2$ in a second cross-car direction if the vent is horizontally oriented. For an air vent assembly 100 oriented in a horizontal position, the directional valve 220 may control the air flow exiting the air outlet 104 to be directed cross-car left, straight, cross-car right or some combination of these directions. For an air vent assembly 100 oriented in a vertical position, the directional valve 220 may control the air flow exiting the air outlet 104 to be directed upward, straight, downward or some combination of these directions.

Referring to FIGS. 2, 4 and 7, each channel 704A, 704B may include fixed vanes 230 having a central groove 232. Optionally, as shown in FIG. 2, the fixed vanes may include a first set of fixed vanes 230A in the first channel 704A and a second set of fixed vanes 230B in the second channel 704B. The first set of fixed vanes 230A in the first channel 704A may be angled or curved in a first direction with respect to a flow vector F of the air inlet 102. Likewise, the second set of fixed vanes 230B in the second channels 704B may be angled or curved in a second direction with respect to a flow vector F of the air inlet 102. The fixed vanes 230A, 230B may be fixed to the housing or otherwise positioned in each channel.

Referring to FIG. 5, a portion of each channel 704A, 704B located above the first interior divider space 130 may form a first duct 502 (such as a nozzle), and a matching portion of each channel 704A, 704B located below the first interior divider space 130 may form a second duct 504 (such as a nozzle). The central groove 232 in the vanes of each channel 704A, 704B extends from the first duct 502 to the second duct 504. Optionally, each central groove 232 may be curved, linear, or the like.

Referring to FIGS. 4 and 5, a movable gate 240 may be located in the central groove 232 in each duct 502, 504. For example, a movable gate 240 may be a curved panel and may be located within in each channel 704A, 704B. The moveable gate 240 may be a single structure that extends across both channels, or it may have individual segments positioned within each channel 704A, 704B. The moveable gate 240 may be interconnected to a third actuator 516 that is configured to move each of the moveable gates 240 of the vents in unison, as will be described in more detail below. A noted above, the movable gate 240 may be a single gate assembly. Alternatively, the movable gate 240 may have separate segments for each duct, each of which is individually controlled by a separate actuator.

Figure 6A:
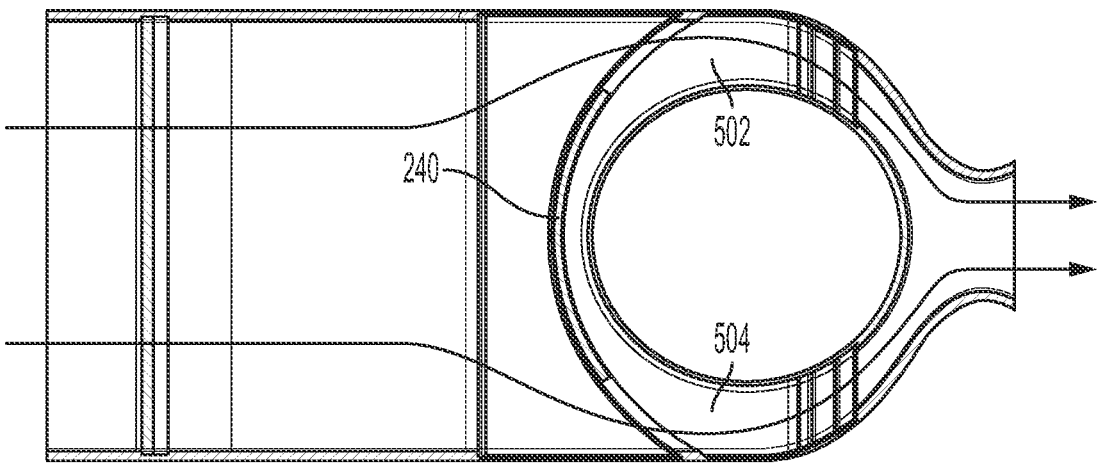
FIGS. 6A-6C are partial sectional views of the air vent assembly similar to that in FIG. 5 in which a vane is positioned in different locations.
Figure 6B:
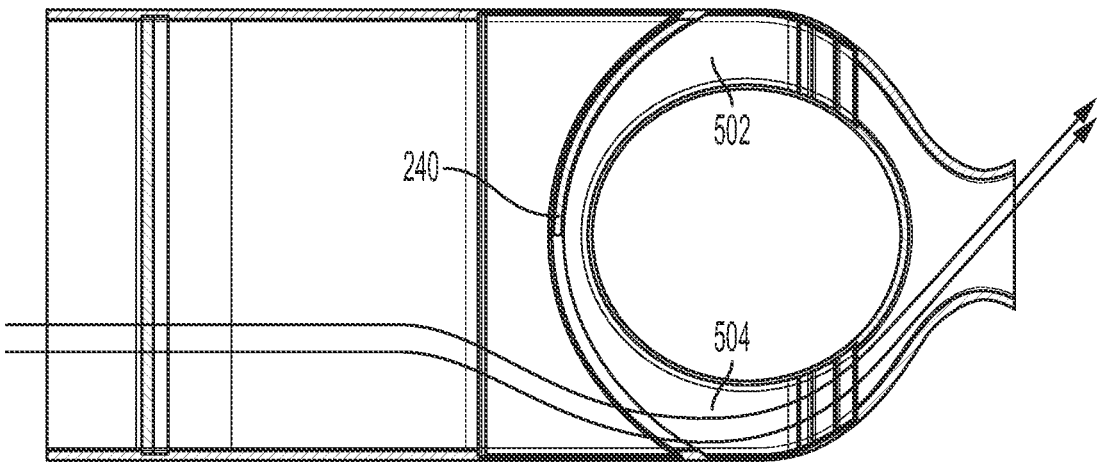
Figure 6C:
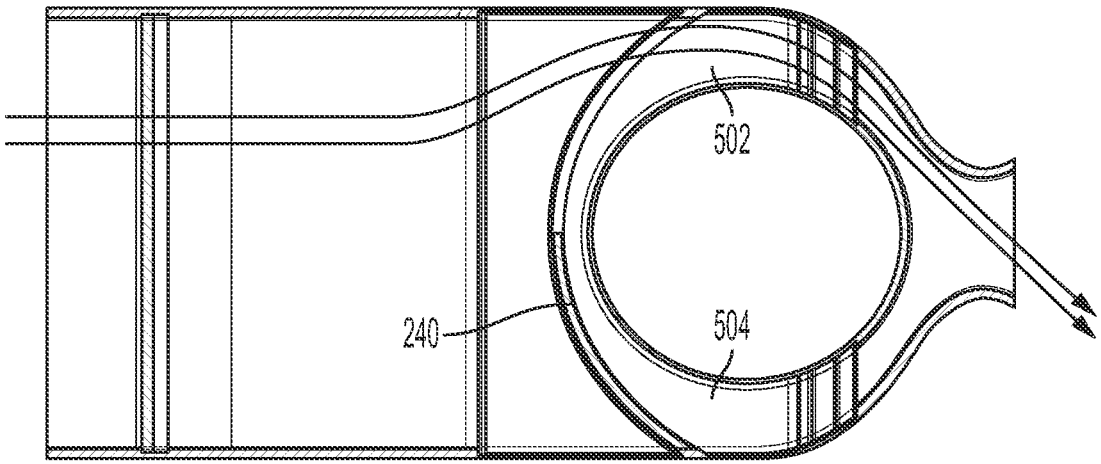

For example, when the movable gate 240 is at a midway point, the air flow is directed through the air outlet 104 substantially centered, as shown in FIG. 6A. As shown in FIGS. 5 and 6B, when the movable gate 240 is rotated in a first direction 506 past the midway point, relatively more of the air flow is directed upward (or in a first cross-car direction) than downward, and thus relatively more of the air exits the air outlet 104 in the direction of a third angle $\theta_3$ with respect to the initial entry flow vector F of the air inlet 102. As shown in FIGS. 5 and 6C, when the movable gate 240 is rotated in a second direction 508 past the midway point, relatively more of the air flow is directed downward (or in a second cross-car direction) than upward, and thus relatively more of the air exits the air outlet 104 in the direction of a fourth angle $\theta_4$ with respect to the initial entry flow vector F as shown in FIGS. 5 and 6C. The third angle $\theta_3$ and the fourth angle $\theta_4$ may be approximately 45° to 75°. For example, the third angle $\theta_3$ and the fourth angle $\theta_4$ may be 60° providing a wide zone of conditioned air possibilities. For an air vent assembly 100 oriented in a horizontal position, the movable gates 240 may control the air flow exiting the air outlet 104 to be directed upward, straight, downward or some combination therein. For an air vent assembly 100 oriented in a vertical position, the movable gates 240 may control the air flow exiting the air outlet 104 to be directed cross-car left, straight, cross-car right or some combination therein.

Near the elongated edges 104A of the air outlet 104, curved interior surfaces forming a nozzle may be provided (see FIG. 5). The nozzle at the air outlet 104 is opened to allow for some pressure recovery due to the Coandă effect. The Coandă effect is the phenomena in which a jet flow attaches itself to a nearby surface and remains attached even when the surface curves away from the initial jet direction. This pressure recovery may reduce and/or eliminate whistling noise caused by air exiting the air outlet 104.

The first actuator 510, the second actuator 514, and the third actuator 516 may be operated by a common motor or may be operated by individual motors. For example, a first motor may operate the first actuator connected to the flow volume regulating valve 210, a second motor may operate the second actuator connected to the directional valve 220, and a third motor may operate the third actuator connected to the movable gates 240.

The actuators may be controlled by a user input on an electronic screen having capacitive 'touch screen' capabilities. The air vent assembly 100 does not include manual controls in the air outlet 104 and thus may have a slim profile compared to an air vent outlet having manual controls. User preferences may be preset for different occupants wherein a user may set an air conditioning preference of air flow directions for each individual vehicle occupant. For example, a first driver may desire all instrument panel air vents to direct air flow toward his or her center of mass while a second driver may desire having all air vents direct air flow centered toward the general passenger compartment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." When used in this document, the term "exemplary" is intended to mean "by way of example" and is not intended to indicate that a particular exemplary item is preferred or required.

When used in this document, terms such as "top" and "bottom," "upper" and "lower", "upward" and "downward", "cross-car left" and "cross-car right", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

In this document, when terms such "first" and "second" are used to modify a noun, such use is simply intended to distinguish one item from another, and is not intended to require a sequential order unless specifically stated. The terms "approximately" and "about" when used in connection with a numeric value, is intended to include values that are close to, but not exactly, the number. For example, in some embodiments, the term "approximately" may include values that are within +/−10 percent of the value.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. An air vent assembly comprising:
   an air inlet;
   an air outlet;
   a plurality of channels positioned between the air inlet and the air outlet;
   a first set of fixed vanes in a first one of the channels, wherein the fixed vanes of the first set are angled or curved in a first direction with respect to a flow vector of the air inlet;
   a second set of fixed vanes in a second one of the channels, wherein the fixed vanes of the second set are angled or curved in a second direction with respect to a flow vector of the air inlet; and
   a gate that is positioned within grooves of each of the fixed vanes, and that is configured to regulate a position at which air may enter the first and second channels from the air inlet.

2. The air vent assembly of claim 1, further comprising an actuator that is configured to move the gate.

3. The air vent assembly of claim 1, wherein the gate comprises:
   a first gate segment that is positioned in grooves of the first set of fixed vanes; and
   a second gate segment that is positioned in grooves of the second set of fixed vanes.

4. The air vent assembly of claim 1, wherein the gate is configured to be moved so that:
   moving the gate in a first direction will narrow a size of a first duct leading to the first and second channels; and
   moving the gate in a second direction will narrow a size of a second duct leading to the first and second channels.

5. The air vent assembly of claim 4, further comprising a divider that is proximate the vanes and which separates the first duct and the second duct.

6. The air vent assembly of claim 1, further comprising a flow volume regulating valve that is positioned between the air inlet and the channels, and which is configured to regulate volume of air that may flow from the air inlet to the channels when moved.

7. The air vent assembly of claim 6, wherein the flow volume regulating valve includes one or more curved panels positioned within matching curved grooves.

8. The air vent assembly of claim 6, wherein the flow volume regulating valve comprises two walls, each of which is configured to pivot about a respective pivot point.

9. The air vent assembly of claim 1, further comprising a directional valve that is positioned between the air inlet and the fixed vanes, and which is configured to reduce or increase intake size of one or more of the channels when moved.

10. The air vent assembly of claim 9, wherein the directional valve includes a curved panel positioned within matching curved grooves.

11. An air vent assembly comprising:
    an air inlet;
    an air outlet;
    a plurality of channels positioned between the air inlet and the air outlet;
    a first set of fixed vanes in a first one of the channels;
    a second set of fixed vanes in a second one of the channels;
    a gate that is positioned within grooves of each of the fixed vanes, and that is configured to regulate a position at which air may enter the first and second channels from the air inlet; and
    a flow volume regulating valve that is positioned between the air inlet and the channels, and which is configured to regulate volume of air that may flow from the air inlet to the channels when moved.

12. The air vent assembly of claim 11, wherein the gate comprises:
    a first gate segment that is positioned in grooves of the first set of fixed vanes; and
    a second gate segment that is positioned in grooves of the second set of fixed vanes.

13. The air vent assembly of claim 11, wherein the gate is configured to be moved so that:
    moving the gate in a first direction will narrow a size of a first duct leading to the first and second channels; and
    moving the gate in a second direction will narrow a size of a second duct leading to the first and second channels.

14. The air vent assembly of claim 11, wherein the flow volume regulating valve includes one or more curved panels positioned within matching curved grooves.

15. The air vent assembly of claim 11, wherein the flow volume regulating valve comprises two walls, each of which is configured to pivot about a respective pivot point.

16. The air vent assembly of claim 11, further comprising a directional valve that is positioned between the air inlet and the fixed vanes, and which is configured to reduce or increase intake size of one or more of the channels when moved.

17. The air vent assembly of claim 16, wherein the directional valve includes a curved panel positioned within matching curved grooves.

18. An air vent assembly comprising:
    an air inlet;
    an air outlet;
    a plurality of channels positioned between the air inlet and the air outlet;
    a first set of fixed vanes in a first one of the channels, wherein the fixed vanes of the first set are angled or curved in a first direction with respect to a flow vector of the air inlet;
    a second set of fixed vanes in a second one of the channels, wherein the fixed vanes of the second set are angled or curved in a second direction with respect to a flow vector of the air inlet;
    a gate that is positioned within grooves of each of the fixed vanes, and that is configured to regulate a position at which air may enter the first and second channels from the air inlet; and
    a directional valve that is positioned between the air inlet and the fixed vanes, and which is configured to reduce or increase intake size of one or more of the channels when moved.

19. The air vent assembly of claim 18, wherein the directional valve includes a curved panel positioned within matching curved grooves.

20. The air vent assembly of claim 18, wherein the gate comprises:
    a first gate segment that is positioned in grooves of the first set of fixed vanes; and
    a second gate segment that is positioned in grooves of the second set of fixed vanes.

21. The air vent assembly of claim 18, wherein the gate is configured to be moved so that:
    moving the gate in a first direction will narrow a size of a first duct leading to the first and second channels; and
    moving the gate in a second direction will narrow a size of a second duct leading to the first and second channels.

* * * * *